Oct. 6, 1959 J. F. ANETSBERGER 2,907,285
DOUGH ROLLER EQUIPMENT
Filed July 10, 1957 3 Sheets-Sheet 1

INVENTOR.
Joseph F. Anetsberger
BY
Horton, Davis, Brewer & Brugman
Attorneys

Oct. 6, 1959                J. F. ANETSBERGER                2,907,285
                             DOUGH ROLLER EQUIPMENT
Filed July 10, 1957                                         3 Sheets-Sheet 2
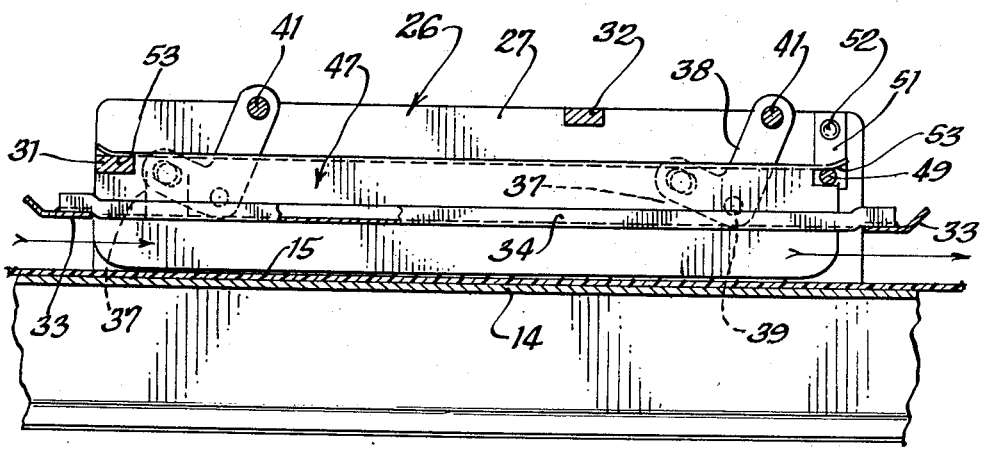
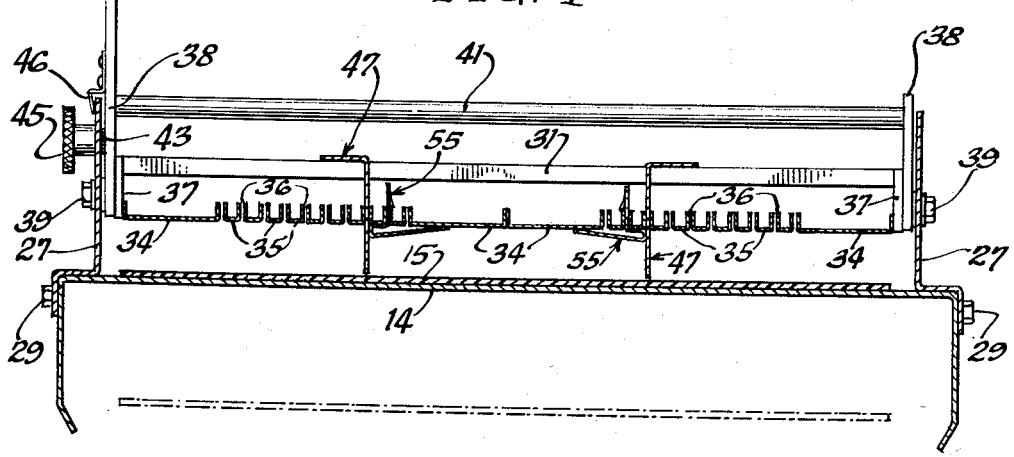
INVENTOR.
Joseph F. Anetsberger
BY
Horton, Davis, Brewer & Brugman
Attorneys Oct. 6, 1959
J. F. ANETSBERGER
2,907,285
DOUGH ROLLER EQUIPMENT
Filed July 10, 1957
3 Sheets-Sheet 3
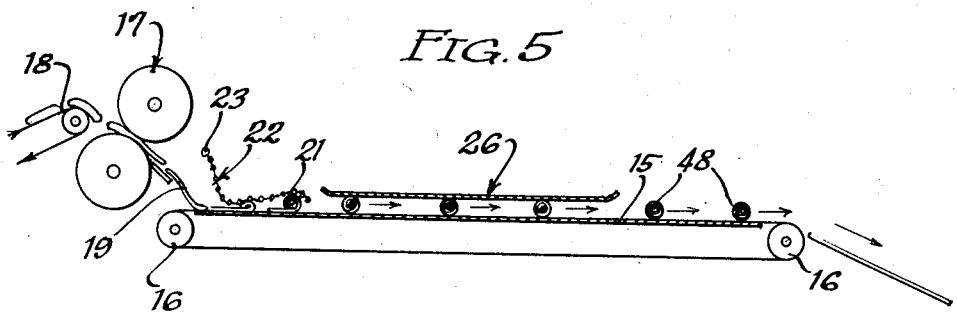
FIG. 5
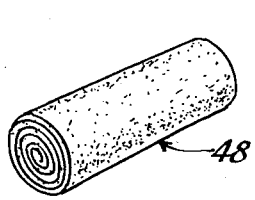
FIG. 6
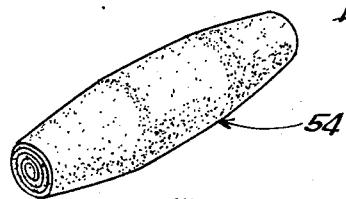
FIG. 7
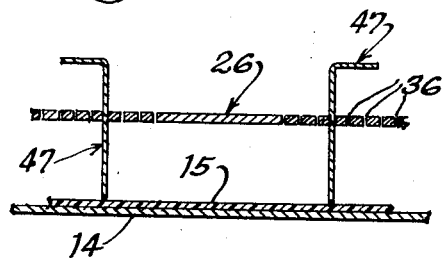
FIG. 8
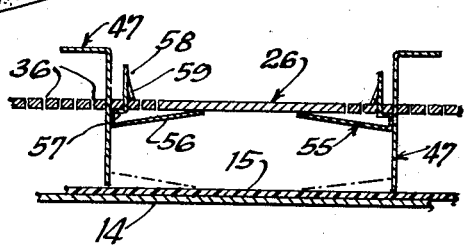
FIG. 9
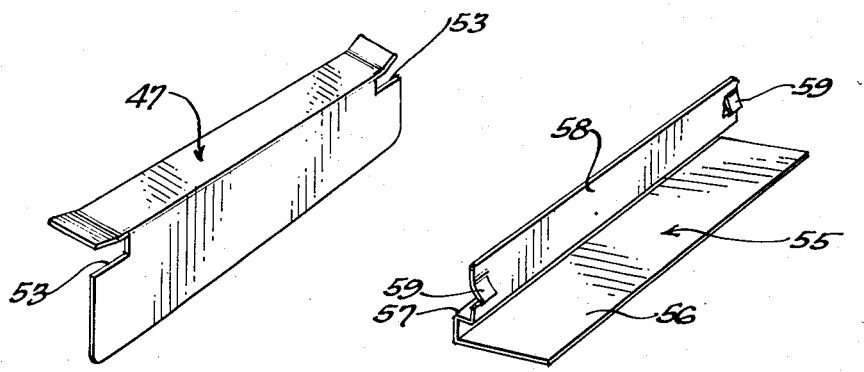
FIG. 10
FIG. 11
INVENTOR.
Joseph F. Anetsberger
BY
Horton, Davis, Brewer & Brugman
Attorneys United States Patent Office 2,907,285
Patented Oct. 6, 1959

2,907,285

DOUGH ROLLER EQUIPMENT

Joseph F. Anetsberger, Northbrook, Ill., assignor to Anetsberger Brothers, Inc., Northbrook, Ill., a corporation of Illinois Application July 10, 1957, Serial No. 671,080

7 Claims. (Cl. 107—9)

This invention relates in general to automatic dough handling equipment, and more particularly to dough rollers for accurately rolling sheeted pieces of dough into end pieces or rolls of predetermined size and shape.

A principal object of the invention is to facilitate and simplify selective adjustments of such dough roller equipment to enable handling of sheeted dough pieces of different thicknesses, lengths and widths and of different types and characteristics.

In the illustrated embodiment of the invention, this object is attained by providing flexible, chain-like means for initially rolling sheeted dough pieces delivered thereto into preliminary or intermediate roll form, the weight of said chain-like means being variable for effective use with sheeted dough pieces of different characteristics and thicknesses, and pressure board means operable on such preliminary rolls and readily vertically adjustable to selectively determine the diameter of the final rolls produced thereby and including side guides which may quickly be adjusted independently of, and relative to, the pressure board means for maintaining constant the selected length of the end or final rolls, such means being constructed for rapid attachment to standard make-up equipment, including an endless belt conveyor, for automatic coaction therewith.

Another object of the invention is to provide a rigid pressure board structure which may be adjusted vertically by the operation of a single member and which will be maintained in a horizontal position at all times.

A further object is to enable optional use of such dough roller equipment to form rolls having rounded or tapered ends.

Numerous other objects and advantages of the invention will be apparent as it is better understood from the following description, which, when taken in connection with the accompanying drawings, discloses a preferred embodiment thereof.

In the drawings:

Fig. 3 is a vertical section taken longitudinally through the pressure board means of Fig. 1;

Fig. 4 is a vertical section taken transversely through the pressure board means;

Fig. 5 is a diagrammatic elevational view, with parts in section, illustrating the process performed by the instant dough roller equipment;

Fig. 6 is a perspective view of a standard form of roll produced with this equipment;

Fig. 7 is a view similar to Fig. 6 of an optional form of roll having rounded or tapered ends that may be produced with this equipment;

Fig. 8 is a transverse vertical section of the pressure board means employed to form the roll of Fig. 6;

Fig. 9 is a view similar to Fig. 8 of the means employed to form the roll of Fig. 7;

Fig. 10 is a perspective view of one of the side guide members; and

Fig. 11 is a perspective view of one of the auxiliary pressure members.

Figure 1:
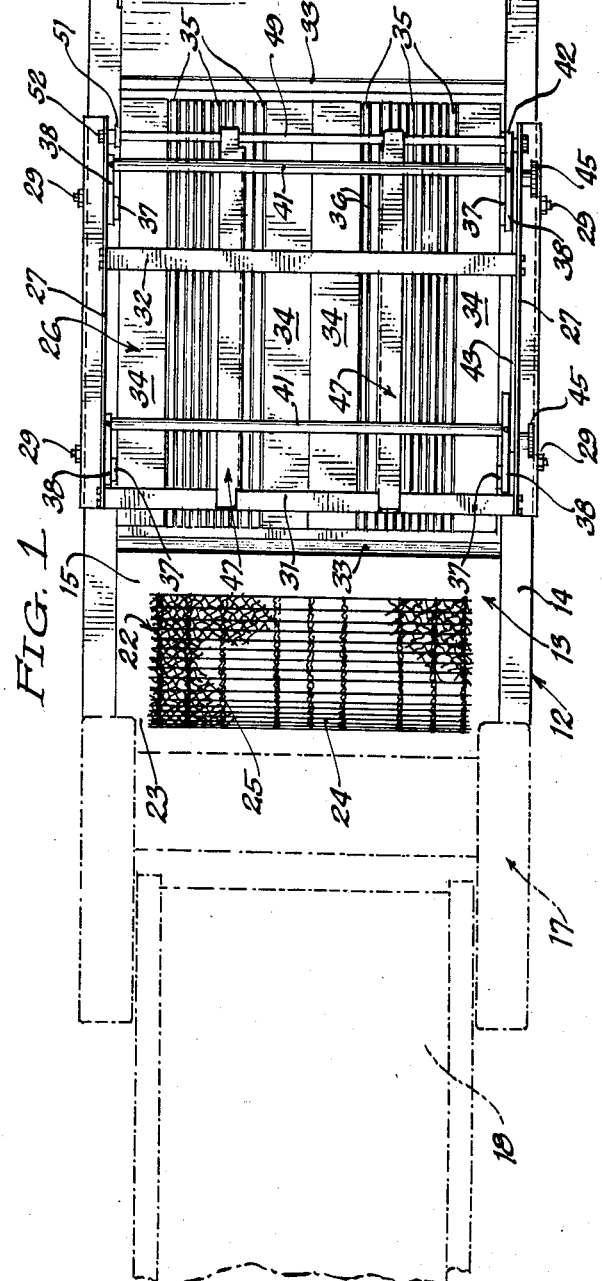
Figure 1 is a plan view of dough roller equipment embodying the features of the present invention, with a suitable dough sheeter for cooperation therewith shown in broken lines.
Figure 2:
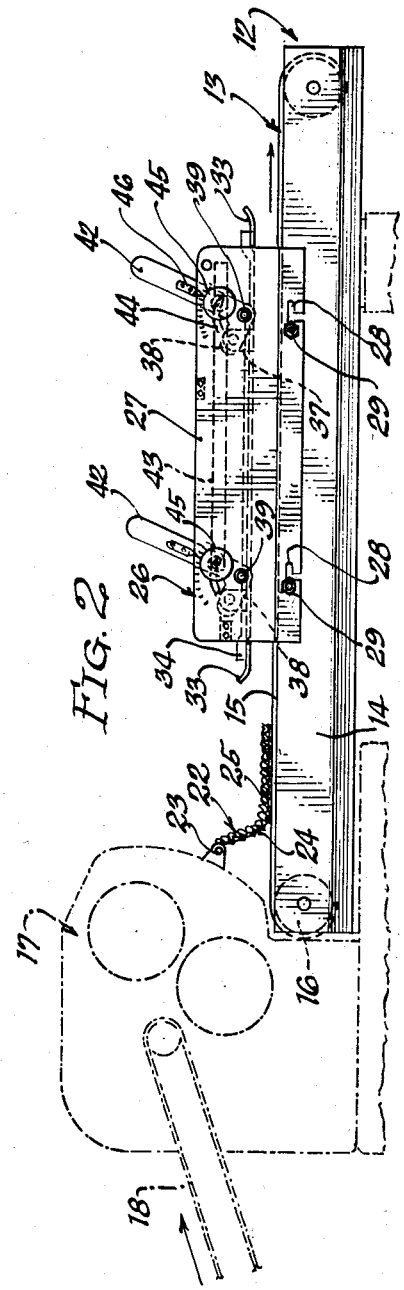
Fig. 2 is a side elevational view of the equipment of Fig. 1.

Referring more particularly to Figs. 1 and 2, the dough roller equipment embodying the features of this invention is therein designated generally by reference numeral 12 and shown as mounted for cooperation with an endless belt conveyor indicated generally by reference numeral 13. The conveyor 13 includes a makeup or work table 14 (Fig. 4), and an endless belt 15 having its upper run supported by table 14 and movable thereover by suitable rollers or belt driving means 16 supported in well-known manner by the work table 14. The belt conveyor 13 is associated in the usual manner with a dough sheeter 17 of any suitable construction that is shown in Figs. 1, 2 and 5 as provided with the usual feed belt 18 for supplying pieces of dough thereto to be rolled and sheeted thereby and delivered as sheeted dough pieces 19 (Fig. 5) to the endless belt 15.

Means are provided for cooperation with the belt 15 for initially rolling the sheeted dough pieces 19 into a preliminary or sheeted roll form, as illustrated at 21 in Fig. 5, which comprises flexible, chain-like means 22 secured at one end in spaced relationship to and above the upper run of the conveyor belt 15, as by means of a transversely extending supporting rod 23 shown in Figs. 1 and 2 as mounted upon the dough sheeter 17. In the illustrated embodiment, this chain-like means 22 comprises a relatively light wire link chain 24 (Figs. 1 and 2) below a relatively heavy mesh chain 25. The trailing end portions of the chains 24, 25 normally are supported by and rest upon the upper run of the conveyor belt 15. Consequently, as illustrated in Fig. 5, a sheeted dough piece 19 carried under this chain-like means 22 by the belt 15 will have its forward motion by the belt 15 retarded at its lead edge, and, as the belt continues to carry the dough piece forwardly, the same will be rolled up into a relatively loose preliminary roll 21 by the time it is moved from under the chain-like means 22. The reason for employing the different types of chains 24 and 25 is to adapt this equipment for selective or optional use with dough pieces of different thicknesses and physical characteristics. For example, the two chains 24 and 25 are employed when bread dough pieces are to be rolled into round loaf form, whereas the upper mesh chain 25 may be lifted and swung upwardly into an inoperative positon and only the lower chain 24 employed when the equipment is used for rolling smaller pieces of dough, as for cinnamon rolls.

Following the forming of the preliminary rolls 21 in the manner above described, the dough roller equipment of this invention functions to compress and work such rolls into final form of selected predetermined diameter and length. This forming operation is accomplished by pressure board means, indicated generally by reference numeral 26, which is mounted upon the work table 14 for cooperation with the endless belt 15. As best seen in Figs. 2 and 4, this pressure board means 26 includes a pair of side frames 27 that are adapted to rest upon the marginal portions of the work table 14 and terminate in downwardly extending flanges having a pair of bayonet or T-slots 28 in their lower edge portions for receiving suitable bolts 29 for removable attachment to the work table 14. As shown in Figs. 1 and 3, the two side frames 27 are rigidly secured together by means of transversely extending bars 31 and 32. The pressure board means 26 thus may readily be rigidly secured to or removed from the work table 14.

The pressure board means 26 constitutes a horizontally disposed pressure board which, in the illustrated embodiment, comprises a pair of transversely extending end frame plates 33 (Figs. 1 and 3) to which are secured, as by means of welding, the upwardly offset ends of four main channel members 34 and a plurality of auxiliary channel members 35 (Fig. 4). Two of the main channel members 34 comprise the outside portions of the pressure plate, while the other two form the central portion thereof and have their innermost abutting flanges welded or otherwise suitably secured together. The auxiliary channel members 35 are interposed in spaced relationship to each other between each of the central main channel members 34 and the associated outermost one thereof to define a plurality of vertical slots 36. The lower surfaces of the end plates 33 and the several channel members 34 and 35 define the working surface of the pressure board which cooperates with the endless belt 15 to compress and work upon the preliminary rolls 21. As best seen in Fig. 3, the outer edges of the end frame plates 33 are bent upwardly so as to properly receive the preliminary rolls at the entry end of the pressure board.

To the outer flanges of each of the outer main channel members 34 a pair of upstanding hangers or brackets 37 (Figs. 3 and 4) is secured at their lower ends which have a suitable pin-and-slot pivotal connection at their upper ends, respectively, with the short arms of substantially right-angled, two-armed levers 38. Each of the levers 38 is pivotally mounted intermediate its ends on one of the side frames 27 in any suitable manner, as by means of a shouldered bolt 39. There are four such levers 38 arranged in two transversely aligned pairs, and the upper ends of the longer arms of the paired levers 38 are interconnected by transversely extending tie rods 41. As best seen in Figs. 2 and 4, the longer arms of one or both of the levers 38 at one side of the pressure board are extended upwardly to provide a handle 42, and these two levers 38 have their upper arms pivotally interconnected by means of a link or bar 43 (Figs. 1, 2 and 4). Consequently, manual movement of a handle 42 will result in simultaneous and corresponding movements of each of the four levers 38 to raise or lower the pressure board comprising the members 33, 34 and 35 relative to the side frames 27 and the belt 15. It also will be apparent that during any such movements of the pressure board, the latter will be maintained in a horizontal position.

One of the side frames 27, i.e., that adjacent the lever or levers 38 having the extended handle 42, is provided with a pair of arcuate slots 44 (Fig. 2) to accommodate outward extensions of the pivot pins interconnecting the associated levers 38 and the link 43. Mounted upon the outwardly extending ends of each of these pivot pins are suitable locking knobs 45 preferably having enlarged knurled heads (Figs. 2 and 4) and adapted to rigidly clamp the associated lever 38 in adjusted position to the frame 27 in well-known manner. If desired, the frame 27 may be provided with suitable indicia inscribed adjacent the arcuate slots 44 for cooperation with pointers 46 mounted upon the handles 42 so as to accurately indicate the adjusted position of the pressure plate, preferably in terms of the vertical distance thereof from the upper run of the endless belt 15, which comprises the diameter of the finished rolls.

The pressure board means 26 also includes a pair of vertically disposed side guide means or members 47, one of which is illustrated in perspective in Fig. 10, for defining the lateral width, and closing the sides, of the work space between the horizontal pressure board and the belt conveyor 15 which is to be employed in forming the final rolls from the preliminary rolls 21. These side guide members 47 may be quickly selectively positioned in desired ones of the slots 36 (Figs. 1 and 4), and comprise means for determining the lengths of the final rolls, such as those indicated by reference numeral 48 in Figs. 5 and 6. The several slots 36 preferably are slightly longer than the main vertical portions of the side guide members 47 and in width are substantially the same as the thickness of those vertical portions of the guide members so that the latter are freely slidable therethrough. Means are provided for releasably retaining the dough guides 47 in selected position, for vertically supporting the same and for preventing vertical movement thereof during adjusting movements of the horizontal pressure plate. This means comprises the forward transverse bar 31 (Fig. 3) and a transversely extending rod 49 disposed adjacent the other or rear end of the pressure board. This rod 49 is secured at its outer ends to links 51 that are pivotally mounted at 52 on the side frames 27. Each of the side guide members 47, as best seen in Fig. 10, is of substantially right-angled cross section to provide a vertical dough guiding portion and a horizontal flange, with the ends of the latter flared upwardly. Below these flared end portions of the horizontal flange, the vertical portion of each guide member 47 is slotted at 53 for cooperation, respectively, with the stationary transverse bar 31 and the swingable transverse rod 49. As shown in Fig. 3, the members 31 and 49 normally function to lock the guide members 47 in their selected slot 36. When it is desired to adjust the mechanism to vary the lengths of the final rolls being formed therewith, or to conform to different widths of sheeted dough pieces, it is only necessary to swing the transverse rod 49 forwardly and upwardly about its pivots 52 to free the same from the slots 53, and then to remove the guide members 47 from the slots 36 in which they are disposed and from engagement with the stationary bar 31. Upon repositioning of the guide members 47 in others of the slots 36 and re-engagement of the forward slots 53 with the bar 31, the guide members may be locked in place by returning the rod 49 to its operative position of Fig. 3. It also will be appreciated that the members 31 and 49, while supporting the lower edges of the guide members 47 directly adjacent the upper run of the belt conveyor 15, will prevent vertical movements of these side guides 47 during vertical adjustments of the pressure plate 33, 34, 35.

When it is desired to form rolls having rounded or tapered ends, such as that indicated by reference numeral 54 in Fig. 7, auxiliary pressure members may be employed for selectively varying the contour or configuration of the pressure surface provided by the pressure board heretofore described. In order to produce a roll uniformly shaped at both ends, two such pressure members are employed, an illustrative one of which is shown in perspective in Fig. 11. Each such pressure member 55 comprises a main portion or plate 56 reversely bent along its outer edge to provide a shoulder portion 57 and terminating in a substantially vertically extending flange 58. The end portions of this flange 58 are cut and struck inwardly to provide retaining spring tabs 59. When it is desired to employ these auxiliary pressure members 55, the same may be mounted as best seen in Figs. 4 and 9 merely by inserting their vertical flanges 58 upwardly into the slots 36 next inwardly adjacent those in which the side guide members 57 are mounted and by pressing the same upwardly to carry the tabs 59 through the slots for engagement with the upper surface of the pressure board to retain the auxiliary pressure members in operative position. The shoulder portion 57 of each of these auxiliary pressure members 55 preferably is so dimensioned as to result in the outer vertical portion or reversely bent part of the pressure member thereby being disposed in sliding contact with the inner surface of the vertical guiding portion of the associated side dough guide 47. At the same time, the main portion 56 is angularly disposed relative to the horizontal under surface of the pressure board so as to effect tapering or rounding of the end portions of the roll 54 at the desired degree of taper or curvature, it being understood that this main portion 56 need not be flat or coplanar as illustrated. In order to remove the auxiliary pressure members 55, it is necessary only to manually retract the spring tabs 59 into the plane of the vertical flange 58 and depress the latter through the slot 36 in which it is mounted.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. Dough roller equipment for use with an endless belt conveyor, comprising a pressure board having a plurality of longitudinally extending slots therethrough, means for rigidly mounting said board in vertically adjustable spaced relationship relative to said conveyor, side guide members selectively slidably positionable in said slots, and means connected to said mounting means for releasably preventing vertical movement of said guide members relative to said conveyor.

2. Dough roller equipment for use with an endless belt conveyor and means for delivering sheeted pieces of dough thereto, comprising a pressure board mounted in vertically spaced relationship to said conveyor for cooperation therewith to form said dough pieces into rolls of predetermined diameter, vertically disposed side guide means interposed between said conveyor and said pressure board for determining the lengths of said rolls, and auxiliary pressure members readily removably attachable to said pressure board adjacent said side guide means to decrease the diameter of the end portions of said rolls.

3. Dough roller equipment according to claim 2, wherein said pressure board is provided with a plurality of parallel slots extending vertically therethrough and said side guide means are slidably positionable in selected ones of said slots.

4. Dough roller equipment according to claim 3, wherein said auxiliary pressure members are selectively positionable in those said slots next inwardly adjacent to said selected ones of said slots, and means for releasably retaining said auxiliary pressure members in operative position in those slots.

5. Dough roller equipment for use with an endless belt conveyor, comprising side frames extending above said conveyor, a pressure board, levers pivotally interconnecting each said side frame and said board for supporting the latter in vertically spaced relation to said conveyor, means interconnecting said levers to maintain said board horizontal at all times, manually releasable locking means normally preventing movement of said levers, a member operable manually upon release of said locking means to move said levers for selectively adjusting said board vertically relative to said conveyor, said pressure board being provided on each side of its transverse center with a plurality of longitudinally extending slots therethrough spaced from each other transversely of said conveyor, side guide members selectively positionable in said slots, and means connected to said side frames and cooperating with said guide members to prevent vertical movement of the latter during adjustments of said board relative to said conveyor.

6. Dough roller equipment for use with an endless belt conveyor and means for delivering sheeted pieces of dough thereto, comprising a pressure board having a plurality of longitudinally extending slots therethrough on each side of its transverse center, means for rigidly mounting said board in vertically adjustable spaced relationship relative to said conveyor for cooperation therewith to form said dough pieces into rolls of predetermined diameter, side guide members selectively slidably positionable in said slots to predetermine the length of said rolls and for maintaining the same constant, and means connected to said mounting means for releasably preventing vertical movement of said guide members relative to said conveyor.

7. Dough roller equipment for use with an endless belt conveyor and means for delivering sheeted pieces of dough thereto, comprising a pressure board having a plurality of longitudinally extending slots therethrough on each side of its transverse center, means for rigidly mounting said board in vertically adjustable spaced relationship relative to said conveyor for cooperation therewith to form said dough pieces into rolls of predetermined diameter, side guide members selectively slidably positionable in said slots to predetermine the length of said rolls and for maintaining the same constant, and auxiliary pressure members selectively positionable in others of said slots for tapering the end portions of said rolls.

References Cited in the file of this patent

UNITED STATES PATENTS

| | | |
|---|---|---|
| 1,037,820 | Carroll | Sept. 3, 1912 |
| 1,577,130 | Labeyrie et al. | Mar. 16, 1926 |
| 1,642,693 | Parsons | Sept. 20, 1927 |
| 1,805,018 | Scruggs | May 12, 1931 |
| 1,870,256 | Lauterbur et al. | Aug. 9, 1932 |
| 2,642,012 | Sticelber | June 16, 1953 |
| 2,759,435 | Krawczak | Aug. 21, 1956 |